Sept. 17, 1935. M. A. NEBRASKE 2,014,663
HYGIENIC AND AUTOMATIC HOLDING AND CLEANSING DEVICE FOR BEER COMBS
Filed March 1, 1934
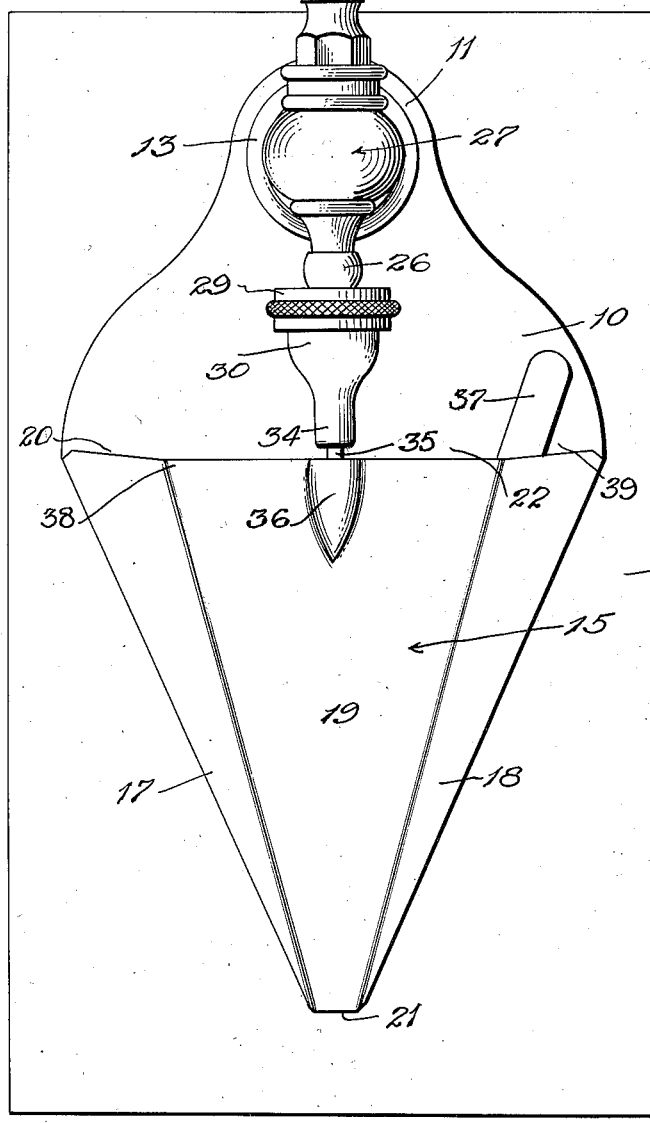
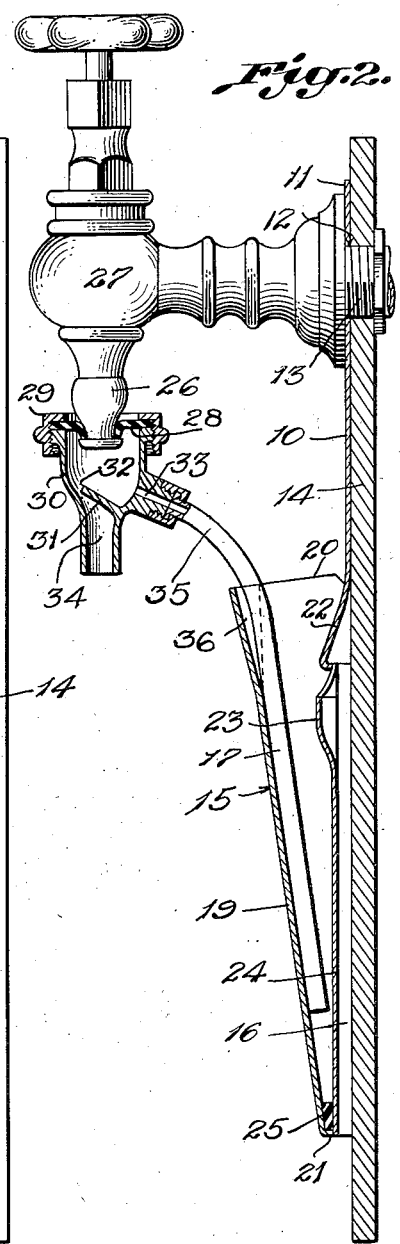
Inventor
MERLYN A. NEBRASKE
BY: James R. McKnight
ATTORNEY Patented Sept. 17, 1935

2,014,663

UNITED STATES PATENT OFFICE 2,014,663

HYGIENIC AND AUTOMATIC HOLDING AND CLEANSING DEVICE FOR BEER COMBS

Merlyn A. Nebraske, Glen Ellyn, Ill.

Application March 1, 1934, Serial No. 713,498

4 Claims. (Cl. 141—1)

My invention relates to a device for holding and automatically cleansing beer combs.

Heretofore in the art where beer has been served over a bar it has been customary for the bartender to use a beer comb to scoop off the excess top foam of a glass or stein of beer. The bartender by custom then places the beer comb in a glass of stationary water until he needs to use the beer comb again for another service. It is apparent that where a glass is used that the water is stationary and in a comparatively short time becomes stale and mixed with some of the beer leavings which have been introduced into the glass from time to time. It is obvious that very soon after the glass has first been used that the water will be so sour and distasteful that it will not properly clean the beer comb but will on the other hand leave the beer comb in such a condition that when the comb is next used to scoop out the top of a beer glass that the comb will leave stale drippings on top of the latest glass of beer to the distaste and disgust of a drinker.

It is the object of my invention to provide a device whereby the beer comb may be conveniently held and entirely cleansed before each serving of a glass or stein of beer.

My device will contain a desired and continuous flow of water. Another object of my invention is to provide a device which may be attached to coolers, faucets or other water pouring devices now in existence. Another object of my invention is to provide automatic overflow means so as to prevent flooding of my structure, and such other objects advantages and capabilities as will later more fully appear and which are inherently possessed by my invention.

While I have shown in the accompanying drawing a preferred embodiment of my invention yet I wish it understood that the same is susceptible of modification and change without departing from the spirit of my invention.

Referring more particularly to the drawing: Fig. 1 is a front view of the embodiment selected to illustrate my invention. Fig. 2 is a section view of the device attached to supporting means.

Referring more particularly to the embodiment selected to illustrate my invention which comprises a body member 10 having a top portion 11 having an opening 12 through which a faucet shank 13 may pass and hold the body member 10 fixed to a cooler or the like 14. Below the top portion 11 the body member 10 assumes the shape of a container 15 which has a back wall 16, side walls 17 and 18 and front wall 19. The top 20 of the container 15 is open. I preferably employ converging walls 17 and 18 so that the bottom 21 of the container 15 is substantially narrow. My back wall 16 has an offset portion 22 adjacent the top thereof and below said offset 22 is an overflow 23. Below the overflow 23 the back wall 16 is formed to produce a concaved portion 24. Seated at the bottom 21 is a rubber rest 25.

Attached to a faucet nozzle 26 of a faucet 27 by a washer 28 is a screw threaded collar 29. Attached to collar 29 is a screw threaded liquid dividing member 30 which has a partition 31 dividing two liquid flow openings 32 and 33. Opening 32 leads to a hollow shank 34 through which the water may pass to be withdrawn in containers for consumption. The other opening 33 to which water is diverted by the semirounded partition 31 leads to a tube 35 which leads downwardly into container 15 and is held in position by a lip 36 in front wall 19.

In use my device operates as follows: Water from the faucet 27, which may be continuously on or which may be turned on by manual operation, pours into my liquid dividing member 30 where a portion of the water passes down through hollow shank 34 and may be taken off into containers for consumption. Water also passes through the other opening 33 in my dividing member 30 into tube 35 and thence into my container 15. When the water in my container 15 has reached the level of overflow 23 the water automatically passes out the overflow down between the cooler 14 and my body member 10 in the concave portion 24 of the back wall 16. When a bartender has finished scooping the excess foam from a glass or stein of beer he then places the comb 37 in either corner 38 or 39 of my container 15. The beer comb 37 will rest on the rubber rest 25 and is substantially covered through its usable length with fresh water. As the beer comb remains in my container 15 the circulating water removes all of the foam from the beer comb and leaves it fresh and clean upon its removal for further service. With such a hygienic apparatus which is automatic in its operation the users of my device will be able to serve beer in an appetizing manner, free from all the nausea heretofore associated with a sour and stale beer comb.

Having thus described my invention,

I claim:

1. An automatic cleansing and hygienic holding member for beer combs comprising in combination, a water flow faucet, a holding member adjacent thereto, a water receiving and dividing member attached to said faucet to receive water therefrom, said dividing member having a pair of outlet openings, one of said openings diverting water into an outlet where it may be withdrawn for consumption and the other of said openings leading through a tube into said holding member, said holding member being adapted to hold and cleanse a beer comb within said water.

2. An automatic cleansing and hygienic holding member for beer combs comprising in combination, a water flow faucet, a holding member adjacent thereto, said holding member having an open top for the reception and holding of a beer comb, a water receiving and dividing member attached to said faucet to receive water therefrom, said dividing member having a pair of outlet openings, one of said openings diverting water into an outlet where it may be withdrawn for consumption and the other of said openings leading through a tube into said holding member, said holding member having an overflow means adjacent its top portion for maintaining a proper level within said holding member.

3. A device particularly adapted for the cleansing of beer combs comprising a top member having an opening therein for the reception of a water faucet, a container below and integral with said top member, said container having an open top, a pair of narrow converging side walls, a concaved back wall having adjacent its top an overflow opening, and a closed bottom having a rubber rest seated therein, said container continuously filled with fresh water from the faucet so that a used beer comb placed on either of the converging sides rests upon the bottom rest and the circulation of water forces the beer foam from said comb up and out through the overflow opening.

4. A device particularly adapted for the cleansing of beer combs comprising a top member having an opening therein receiving a water faucet, a container below and integral with said top member, said container having an open top, a pair of narrow converging side walls, a concaved back wall having adjacent its top an overflow opening, and a closed bottom having a rubber rest seated therein, a water dividing member removably attached to said water faucet, said water dividing member having a partition between two openings, one of said openings leading to a hollow shank for general use, the other of said openings directing the water to a tube leading downwardly into the container, and continuously filling said container with water so that a used beer comb placed on either of the converging sides rests upon the bottom rest and the circulation of water forces the beer foam from said comb up and out through the overflow opening.

MERLYN A. NEBRASKE.